United States Patent Office 2,752,342
Patented June 26, 1956

2,752,342
PREPARATION OF INTESTINAL DISINFECTANTS

Arthur Ernest Wilder Smith and Emil Hofstetter, Wolhusen, Switzerland, assignors to Ed. Geistlich Söhne A. G. für Chemische Industrie, Wolhusen, Lucerne, Switzerland No Drawing. Application November 9, 1953, Serial No. 391,141

Claims priority, application Switzerland November 14, 1952

5 Claims. (Cl. 260—239.95)

This invention relates to new therapeutically active intestinal disinfectants and to a process for preparing the same.

Said compounds are obtained by reacting a sulphanilamide derivative of a di-valent carboxylic acid or a salt thereof with 8-hydroxyquinoline or a salt thereof preferably in an aqueous medium.

Especially suitable sulphanilamide derivatives are 2-($N^4$-phthalyl-sulphanilamido)-thiazol, 2-($N^4$-succinyl-sulphanilamido)-thiazol, phthalyl-sulphacetamide etc.

The reaction is carried out by bringing together equivalent amounts of the two reactants dissolved in an aqueous medium.

The so obtained precipitated products are more or less stable salts or complex-compounds. The 8-hydroxyquinoline compound of 2-($N^4$-succinyl-sulphanilamido)-thiazol for example is not very stable and may be split up when triturated with solvents, whereas the 8-hydroxyquinoline compounds of 2-($N^4$-phthalyl-4-sulphonamido)-thiazol and of phthalyl-sulphacetamide may be recrystallised from methanol or methanol-water without substantial decomposition.

It has been found that the new compounds of this invention have a substantially broader spectrum of physiological activity than the sulphanilamide derivatives or hydroxyquinoline alone.

Suitable salts of the sulphanilamide derivatives are the alkali metal salts, especially the sodium salt, whereas the 8-hydroxyquinoline is preferably used in form of its hydrochloride or sulphate.

Example 1

Five parts of the monosodium salt of 2-($N^4$-phthalyl-sulphanilamido)-thiazol dissolved in 100 parts of water are mixed with a solution of 1.7 parts 8-hydroxyquinoline in 47 parts of 0.25 n hydrochloric acid. A yellow precipitate is formed immediately, which is recrystallised from methanol. The new compound is difficulty soluble in water and forms a yellow powder, which upon heating sinters between 100 and 200° C. and decomposes above 220° C.

Example 2

30 parts phthalyl-sulphathiazol are dissolved in 100 parts by volume alcohol and 100 parts by volume aqueous sodium hydroxide (5%). 10 parts 8-hydroxyquinoline sulphate in 25 parts by volume water are added with stirring at room temperature (20–25° C.). On cooling to about 15° C. the new compound crystallises as a yellow precipitate. After filtering and washing with water and benzene the substance is dried under vacuum at 30–40° C. 8-hydroxyquinoline-phthalyl-sulphathiazolate is a yellow substance which may be crystallised from aqueous methanol with slight hydrolysis. It is sparingly soluble in water and sinters between 100° and 200° C., decomposing at above 220° C.

Example 3

3.6 parts phthalyl-sulphacetamide are dissolved in 12 parts by volume of 1n sodium hydroxide solution and 10 parts by volume of alcohol. To this solution is added at a temperature of 30–40° C. a solution of 1.9 parts of 8-hydroxyquinoline sulphate in 5 parts by volume of water. The solution is then filtered and allowed to stand at 0° C. The oily precipitate solidifies upon standing.

The new compound 8-hydroxyquinoline-phthalylsulphacetamidate is a yellow powder which melts unsharply at 120–130° C. and decomposes at 150–160° C. It is difficultly soluble in water and decomposed by acids.

What we claim is:

1. As a new intestinal disinfectant, the salt of 8-hydroxyquinoline and an $N^4$ sulfanilamide dicarboxylate in which said sulfanilamide has the formula

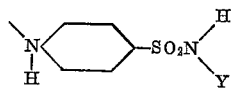

wherein Y is a radical selected from the group consisting of thiazole and acetamid radicals, and said dicarboxylate consists of two carboxyl groups spaced by a radical selected from the group consisting of phenylene and lower alkylene radicals, said 8-hydroxyquinoline neutralizing the free carboxyl group of said dicarboxylate.

2. The salt of 8-hydroxyquinoline and phthalylsulphanilamidothiazolate in which the free carboxyl group is neutralized by the said 8-hydroxyquinoline.

3. The salt of 8-hydroxyquinoline and phthalylsulphacetamidate in which the free carboxyl group is neutralized by the said 8-hydroxyquinoline.

4. The salt of 8-hydroxyquinoline and succinyl sulfanilamidothiazolate in which the free carboxyl group is neutralized by the said 8-hydroxyquinoline.

5. The salt of 8-hydroxyquinoline and phthalyl sulphathiazolate in which the free carboxyl group is neutralized by the said 8-hydroxyquinoline.

References Cited in the file of this patent

UNITED STATES PATENTS

| | | |
|---|---|---|
| 2,324,013 | Moore | July 13, 1943 |
| 2,324,014 | Moore | July 13, 1943 |
| 2,324,015 | Moore | July 13, 1943 |

OTHER REFERENCES

Jain et al.; Chem. Abst., vol. 40, col. 4038 (1946).
Moller et al.; Chem. Abst., vol. 45, col. 4886 (1951).
Gialdi et al.; Chem. Abst., vol. 45, col. 9117 (1951).